United States Patent [19]

Challis

[11] Patent Number: 5,125,760
[45] Date of Patent: Jun. 30, 1992

[54] METHOD AND STRUCTURE FOR JOINING TWO ELONGATE OBJECTS TOGETHER END-TO-END

[75] Inventor: Brian Challis, Sandy, Utah

[73] Assignee: Challis Stairways, Inc., Sandy, Utah

[21] Appl. No.: 718,374

[22] Filed: Jun. 20, 1991

[51] Int. Cl.⁵ .............................. F16B 7/00
[52] U.S. Cl. ................... 403/296; 403/292; 403/13
[58] Field of Search .......... 403/296, 292, 13

[56] References Cited

U.S. PATENT DOCUMENTS

| | | | |
|---|---|---|---|
| 183,358 | 10/1876 | Wright | 403/296 X |
| 970,172 | 9/1910 | Bloom et al. | 403/296 |
| 1,049,624 | 1/1913 | Viertel | 403/296 |
| 2,935,767 | 5/1960 | Naegeli | 403/296 X |
| 3,318,621 | 5/1967 | Hawley | 403/296 |
| 4,067,656 | 1/1978 | Dennis | 403/296 |

FOREIGN PATENT DOCUMENTS 89328  5/1937  Sweden .............................. 403/296

*Primary Examiner*—Andrew V. Kundrat
*Attorney, Agent, or Firm*—Thorpe, North & Western

[57] ABSTRACT

A method and structure for joining two elongate objects together end-to-end includes a first object having an end formed with an annular groove, a second object having an end formed with an annular ridge dimensioned to fit snugly in the annular groove of the first object, and a double-ended screw, one end of which is screwed into the first object at a point spaced equally from the various circumferential sections of the group, and the other end of which is screwed into the second object at a point spaced equally from the various circumferential sections of the ridge to thereby join and hold the first and second objects together with the ridge fitted in the groove.

6 Claims, 1 Drawing Sheet

METHOD AND STRUCTURE FOR JOINING TWO ELONGATE OBJECTS TOGETHER END-TO-END

BACKGROUND OF THE INVENTION

The present invention relates to a joint structure and method for affixing two generally elongate pieces of material in an end-to-end relationship.

Balusters, newels, and similar woodturnings used, for example, in constructing stairways are typically made from a single elongate piece of wood. The woodturnings, as the name indicates, are made by installing the single piece of wood in a lathe, and then turning and carving the piece in the manner desired. The resulting woodturnings are attractive in appearance, presenting a continuous unbroken design form, but they are also costly because of the need for a single piece of wood of a certain length from which the woodturning is made. Shorter pieces of wood than those used to produce the balusters, newels, and the like cost significantly less and, if joined together end-to-end, could significantly reduce the overall cost of producing the woodturning. However, typical approaches to joining pieces of wood end-to-end oftentimes result in a woodturning with an obvious joint showing between the two pieces joined together, and with a joint which is oftentimes weak and subject to breaking.

SUMMARY OF THE INVENTION

It is an object of the invention to provide a simple method and structure for joining together two elongate pieces of material in an end-to-end relationship, with a joint between the two pieces being substantially obscured.

It is another object of the invention to provide such a structure which is simple to manufacture and yet is rugged and sturdy.

It is also an object of the invention to provide such a structure which includes a self-aligning feature.

The above objects are realized in a specific illustrative embodiment of a two-piece elongate woodturning made in accordance with the present invention. The woodturning includes a base element having an upper end formed with an annular groove therein, a stem section having a lower end with an annular ridge which projects downwardly to fit within the annular groove, and a fastener, such as a double-ended dowel screw, fastened to the base element centrally of the annular groove and to the stem section centrally of the annular ridge. The fastener serves to pull the base element and stem section together s that the ridge of the stem fits snugly in the groove of the base element.

Advantageously, the annular groove has a cross-section which is generally V-shaped, and the annular ridge has a cross-section which is generally inverted V-shaped. The circumference of the apex of the ridge is the same as or just greater than the circumference of the bottom of the groove so that the outer wall of the annular ridge tightly contacts the outer wall of the groove to present a tight-fitting joint not easily recognized as such.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
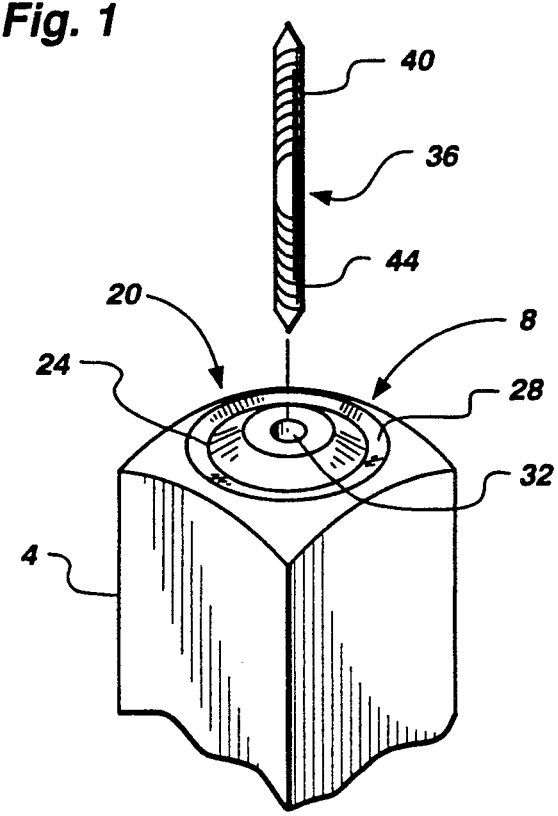
FIG. 1 is a perspective, fragmented view of one piece of a two-piece elongate woodturning made in accordance with the principles of the present invention.
Figure 2:
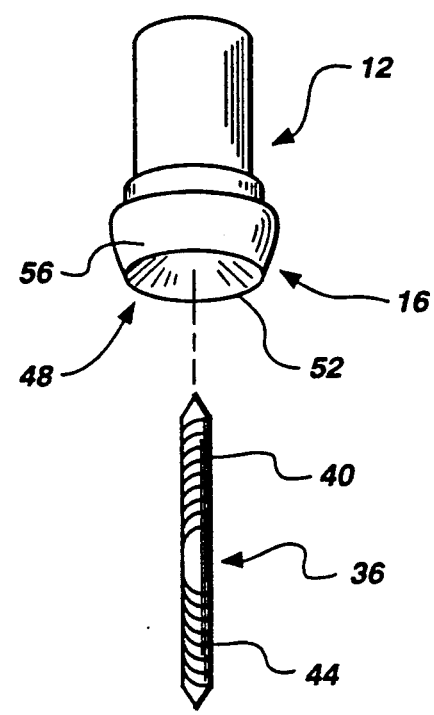
FIG. 2 is a perspective, fragmented view of the second piece of a two-piece woodturning, suitable for use with the piece of FIG. 1.

FIG. 1 is a perspective, fragmented view of a base element 4 of a baluster formed at its upper end with a receptacle portion 8 formed in accordance with the present invention. FIG. 2 is a perspective, fragmented view of a stem portion 12 of a baluster formed with an insert section 16 at its lower end for insertion into the receptacle section 8 (FIG. 1) again in accordance with the present invention. The resulting joint between the base element 4 and stem 12 is illustrated in cross-sectional, fragmented view of FIG. 3.

Figure 3:
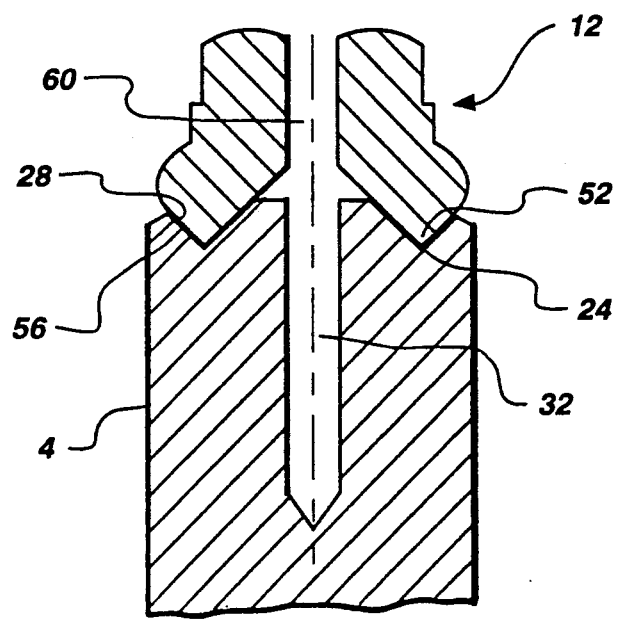
FIG. 3 is a side, cross-sectional view of the pieces of FIGS. 1 and 2 shown joined together in accordance with the present invention.

Referring now to FIG. 1, the base element 4 is shown to have a generally square top cross-section (although it could have other configurations), with the upper end thereof being slightly rounded. Formed in the upper end is an annular groove 20 whose cross-section is generally V-shaped (or hollow V) as shown in FIG. 3. Formed centrally of the annular groove 20 is a bore 32 for receiving one end of a dowel or double-sided screw 36. In particular, the lower end 44 of the screw 36 would be screwed into the bore 32 as will be discussed momentarily.

Referring to FIG. 2, there is shown the stem 12 whose lower end or insert section 16 is formed with an annular ridge 48 whose cross-section is generally in the shape of an inverted V (or V projection). Also formed in the stem 12 centrally of the annular ridge 48 is a bore 60 (FIG. 3) which extends coincidentally with the axis of the stem, as does the bore 32 with the axis of the base element 4. The bore 60 is for receiving an upper end 40 of the dowel screw 36 as indicated in FIG. 2.

It is desired that when the stem 12 is joined to the bas element 4, it will not be readily apparent that there exists a joint between the two pieces but rather that the two pieces appear as a single unitary piece, i.e., a woodturning made from a single piece of wood. In order to accomplish this, the circumference of the peak or apex 52 of the annular ridge 48 is the same as or just greater than the circumference of the bottom 24 of the groove 20 so that when the insert section 16 is inserted into the receptacle section 8, an outer wall 56 of the ridge 48 will tightly contact an outer wall 28 of the annular groove 20 before the apex of the ridge reaches the bottom of the groove. With such a tight contact, there will be no gap between the ridge 48 and the groove 20 at least from an exterior view. Of course, the groove 20 and ridge 48 are formed with mutually compatible walls and cross-sectional areas so that the ridge is received snugly into the groove when the two pieces are joined together.

The base element 4 and stem 12 are joined together by first screwing the dowel screw 36 into the bore 32 of the base element, at least part of the length of the lower end 44 of the screw. An adhesive is then placed in the bottom of the groove 20, with such adhesive being conventional wood glue for example. The upper end 40 of the dowel screw 36 is then screwed at least part way into the bore 60 of the stem 12. The joint is tightened to the ultimately desired fit by simply twisting the stem 12 relative to the base element 4. When joined in this fashion, the combination of the groove 20, ridge 48 and dowel screw 36 serve both to axially align the parts and to prevent lateral displacement of the stem 12 relative to the base element 4. The groove 20 also serves to hide the ridge 48 to present a joint seemingly constructed of a single piece of material. The adhesive placed in the groove 20, when it sets up, prevents rotational displacement of the stem 12 relative to the base element 4.

Although the joint of the present invention has been described for use with a two-piece baluster, it should be apparent that the joint could be used with a variety of objects where it is desired to join two generally elongate pieces of material together or even just two pieces of any shape. Also, other types of materials, in addition to wood, could also be used for the pieces being joined. In all cases, the joint allows for fitting two pieces of material together in a way which hides and obscures the two piece nature of the assembly.

It is to be understood that the above-described arrangements are only illustrative of the application of the principles of the present invention. Numerous modifications and alternative arrangements may be devised by those skilled in the art without departing from the spirit and scope of the and the appended claims are intended to cover such modifications and arrangements.

What is claimed is:

1. A joint for joining together two generally elongate objects in an end-to-end relationship comprising
    a first object having an end formed with an annular groove, said annular groove having a generally V-shaped cross-section,
    a second object having an end formed with an annular ridge, said ridge having a generally inverted V-shaped cross-section, said ridge being dimensioned to fit snugly in the annular groove of the first object, the annular groove being deeper than the annular ridge is high and the circumference of the peak of the ridge is at least as great as the circumference of the groove bottom, and
    a double-ended screw, one end for screwing into the first object at a point spaced equally from the various circumferential sections of the groove, and the other end for screwing into the second object at a point spaced equally from the various circumferential sections of the ridge to thereby hold the first and second objects together with the ridge fitted in the groove.

2. A method of joining together first and second pieces of material comprising
    (a) forming a circular substantially V-shaped groove in the first piece,
    (b) forming a circular substantially inverted V-shaped ridge in the second piece, said circular ridge being substantially the same in circumference as is the circular groove and with a peak whose circumference is just greater than the circumference of the bottom of the groove to enable joining the two pieces together with the ridge fitting within the groove, and
    (c) screwing opposite ends of a double-ended screw into respective first and second pieces at the respective circumferential centers of the groove and ridge to join the first and second pieces together so that the ridge fits tightly into the groove.

3. A method as in claim 2 further comprising applying adhesive between the groove and ridge while screwing the screw into the first and second pieces.

4. A two-piece elongate woodturning capable of use as a load bearing member comprising
    a base load supportive element having an annular groove therein, cross-section of the annular groove being generally V-shaped,
    a stem load supportive section having a lower end formed with an annular ridge which projects downwardly to fit within the annular groove, the cross-section of the annular ridge being generally an inverted V-shape and the circumference of the apex of the ridge is just greater than the circumference of the bottom of the groove such that the annular ridge fits snugly into the groove, and
    a fastener means fastened to the base element centrally of the annular groove, and to the stem section centrally of the annular ridge, to hold the stem section onto the base element with the ridge fitted into the groove.

5. A two-piece elongate woodturning as defined in claim 4 wherein the base load bearing element and the stem load bearing element each comprise part of a baluster.

6. A two-piece woodturning as in claim 4 wherein said fastener means comprises a dowel screw which is screwed into both the base element and stem section centrally of the annular groove and annular ridge respectively to hold the stem section onto the base element.

* * * * *